Dec. 24, 1957  W. R. STEWART  2,817,382
SEMI-PNEUMATIC TIRE HAVING RIM-ENGAGING LUGS
Filed Feb. 23, 1954
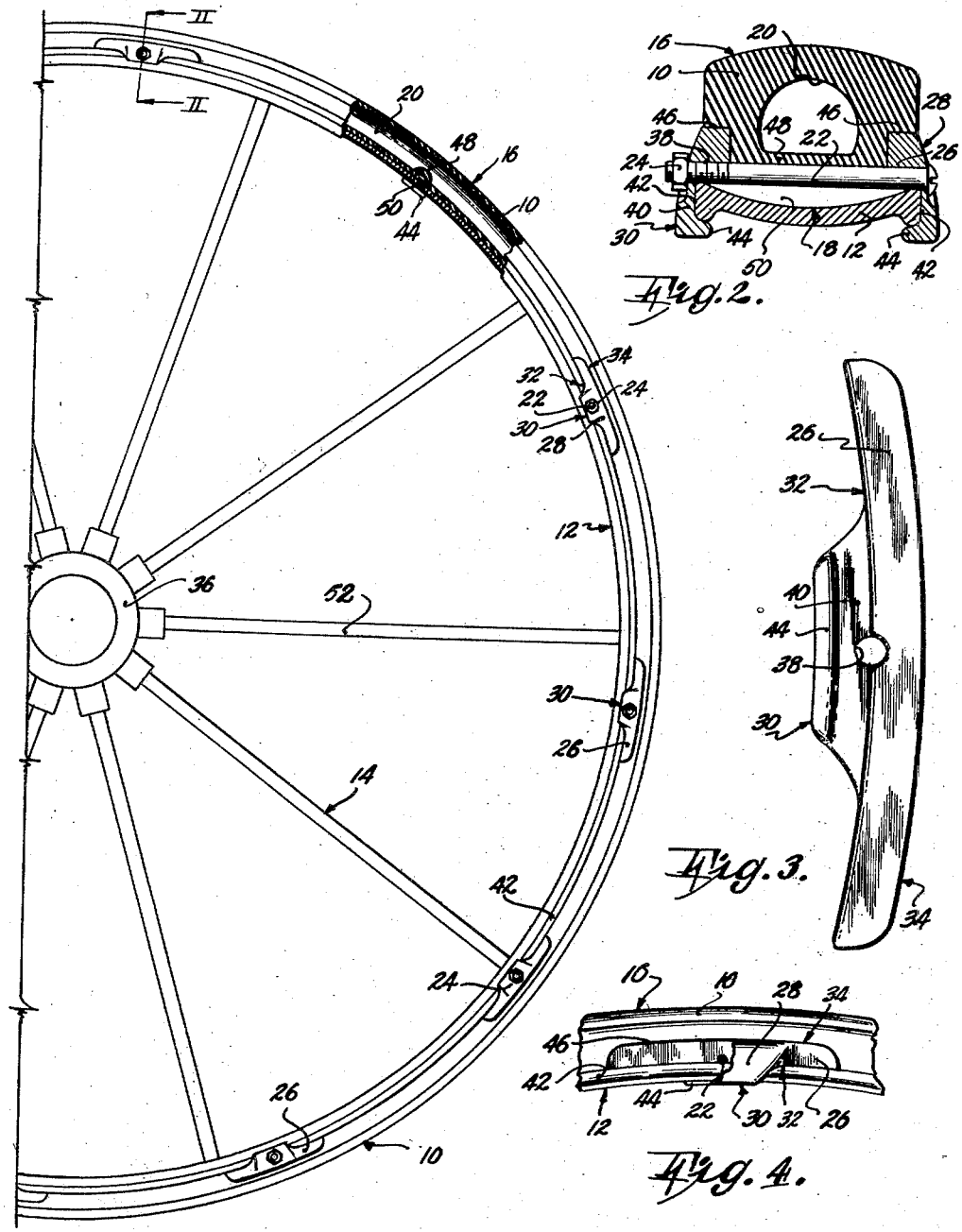
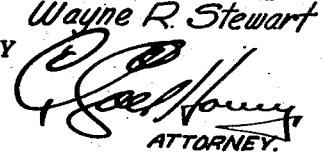
INVENTOR.
Wayne R. Stewart
BY
ATTORNEY.

United States Patent Office 2,817,382
Patented Dec. 24, 1957

2,817,382

SEMI-PNEUMATIC TIRE HAVING RIM-ENGAGING LUGS

Wayne R. Stewart, Hutchinson, Kans., assignor to Stewart-Hodge, Inc., Hutchinson, Kans., a corporation of Kansas Application February 23, 1954, Serial No. 411,672

6 Claims. (Cl. 152—385)

This invention relates to wheel and tire assemblies and more particularly to the meeting of the difficult problem of keeping a semi-pneumatic tire from being thrown or forced off the rim of farm implement wheels not only during manipulation of turns but over hard or tough soils, stony or trashy ground, on hillsides and other uneven terrain such as ridges, depressions and contoured land.

It is the most important object of the present invention to equip heavy press wheels of grain drills with a tubular tire of flexible material to eliminate the extremely difficult problem of dirt collecting and caking on the press wheels, and at the same time, to effectively hold the tire in place on the rim of the wheel, notwithstanding the great amount of weight which the tire must bear and the adverse condition to which the tire must be subjected during use.

The importance of full and complete packing of the soil over the seed is better understood today than ever before. Agriculturists universally recognize that wind erosion, drought and winterkill reduce grain-growing profits primarily because of improper seeding. While implement manufacturers have made great strides in improving upon press wheel assemblies, until the advent of the rubber tire as disclosed in my U. S. Letters Patent No. 2,614,602, proper covering and packing of the seed was still impossible.

The principles set forth in my patent relative to continued and automatic removal of soil collection have now been tested and proved beyond question. The wheel and tire assembly therein disclosed has been used constantly under all types of weather, soil and terrain conditions for many years and in various locales with completely successful results.

However, in extending the application of the unit, as therein set forth, to drills differing from those for which the invention was designed, additional problems were presented, and it is the aim of this invention to provide structure to overcome the new problems with which I have been confronted.

It is the primary object of the present invention therefore, to provide a tire and a clip-type mounting that will permit extension of the novel features of my said patent to the field of relatively heavy packing wheel assemblies of a type of grain drill used extensively in particular sections of the large grain belt area of this country and other agricultural countries of the world.

Reference may be had to the following specification for a better understanding of additional objects and novel features of the present invention, when considered in light of the accompanying drawing, wherein:

Figure 1 is a fragmentary, side elevational view of a grain drill press wheel, showing my semi-pneumatic tire mounted thereon, parts being broken away and in section to reveal details of construction.

Fig. 2 is an enlarged, transverse, cross-sectional view taken on line II—II of Fig. 1 through one pair of the novel clips used to hold the tire in place.

Fig. 3 is an enlarged, inside elevational view of one of the clips entirely removed from the wheel and tire unit; and Fig. 4 is an enlarged, fragmentary, elevational view of the wheel and tire unit showing one of the clips in elevation and broken away for clearness.

In referring to my patent above mentioned, it will be seen that there is disclosed a flexible tire made from rubber or the like which is triangular-shaped in transverse cross-section. It is held in place by a number of pairs of opposed, substantially L-shaped clips interconnected by bolt and nut means. As above indicated, such construction has proved fully satisfactory for the particular type of grain drill with which it has been used.

However, the weight which such tire has to bear is insignificant when compared with the weight-supporting needs of tire 10 shown in the instant drawings. When the teachings of my patent were extended to grain drills having heavily loaded packing wheel gangs, it was found that the clips therein shown were grossly inadequate to hold tire 10 in place, and the bolts used in connection with such clips would shear off, resulting in tire 10 being thrown off rim 12 of wheel 14.

It is to be noted that tire 10 has a transversely convex, peripheral surface 16 and a similarly-shaped inner surface 18 which conforms to the slightly concave transverse concavity of circular rim 12.

It is to be explained that grain drills are equipped with various kinds of furrow openers. Hoe-type openers are used for hard or stony soil conditions; tough or trashy ground requires the use of single-disc openers; when deep, wide furrows or ridging is desired, moldboard openers are utilized; and double-disc openers are better in other soil conditions.

Accordingly, when the furrow does not lend itself particularly to the V-type tire shown in my patent, tire 10 is employed for better packing and coverage of the seed at the bottom of the furrow.

However, as explained in my patent, the primary advantage of covering the wheel rim with a flexible tire is to prevent caking of dirt. It is not difficult to appreciate the inadequacy of proper pressing and coverage when chunks of caked dirt break off from time-to-time, leaving voids where no packing action whatsoever takes place. Thus, as in my patent, tire 10 is also provided with a continuous, annular space 20, permitting constant compression of tire 10 at the bottom thereof where the load is borne, and expansion as the wheel 14 rolls to relieve tire 10 of the load where it is out of contact with the ground.

Tire 10 is made of any suitable material, preferably rubber, and it is to be pointed out that the present invention is rendered still more practical because of recent development of means to protect the rubber from deterioration due to weather and soil conditions. By virtue of its flexible nature, tire 10 may be and preferably is, stretched tightly over the rim 12 in circumscribing relationship thereto.

Shearing of bolts 22 (having nuts 24 thereon) is prevented, and tire 10 is held in place on rim 12, notwithstanding the great weight to which the pressing unit is subjected, by the provision of a novel clip 26, and by virtue of the way in which it is associated with the tire 10 and the rim 12.

Each clip 26 is in the nature of a relatively heavy, elongated metal bar of uniform width and thickness except only for the provision of a central boss 28 on the outermost face thereof that terminates in a median L-shaped hook 30. Clip 26 is longitudinally arched, presenting a rim-engaging, innermost concave surface 32 and an outermost convex surface 34, both concentric with the axis of rotation of wheel 14 at hub 36 in the same manner as rim 12.

Clips 26 are arranged in opposed pairs, equally spaced circumferentially around rim 12, and each pair is joined by the take-up means which consists of bolts 22 and their nuts 24. Thus, each clip 26 is provided with a central, bolt-receiving opening 38 passing through boss 28 and leg 40 of hook 30. Take-up means 22—24 not only clamp the legs 40 tightly against annular edges 42 of rim 18, but compress the tire 10 transversely thereof between the innermost, flat faces of clips 26.

Additionally, by virtue of the fact that relatively short legs 44 of hooks 30 lap beneath rim 12, hooks 38 are looped over edges 42 of rim 12, and the marginal edges of rim 12 are embraced tightly between legs 44 and concave edges 32.

Tire 10 is specially formed to receive the clips 26 and the bolts 22. To this end, clip-receiving cavities 46, conforming complementally with clips 26 in size and shape, are formed in the sides of tire 10. Manifestly, therefore, each cavity 46 has a concave bottom fitting convex edge 34 of clip 26 and facing rim 12, a flat, outwardly facing surface that receives the flat innermost face of clip 26 shown in Fig. 3, and rounded ends which confine the clips 26 against end-wise movement relative to tire 10.

Additionally, tire 10 has ribs 48 extending into space 20 as shown in Figs. 1 and 2, presenting grooves 50 extending between opposed cavities 46 and clearing bolts 22 so that the latter directly engage the rim 12 at its outermost, marginal edges.

Oftentimes, the gang of pressing wheels of grain drills are arranged in side-by-side pairs with a relatively small space between adjacent wheels. Pressure of dirt collecting between the wheels is great, but it has been found that even such pressure is insufficient to dislodge tires 10 from rims 12 or cause shearing of bolts 22. It is recommended that in such arrangement, hubs 36 be attached to the common supporting axle so that spokes 52 are offset relative to adjacent wheels. This likewise offsets clips 26 and provides a more sturdy double wheel tire assembly.

Under all conditions of use, clips 26 cooperate with the taut fit of tire 10 on rim 12 to hold the tire against movement in any direction relative to wheel 14. With rim 12 clamped tightly between clips 26 and with tire 10 compressed transversely between opposed cavities 46 it is impossible for tire 10 to slip from within concave outermost face of rim 12.

But equally as important is the way in which tire 10 is permitted to flex freely to remove collected soil without adversely affecting the clip units and particularly the take-up means 22—24 therefor. Clips 26 present a bridge between the tire 10 and the rim 12 to support the weight imparted downwardly from hub 36, through spokes 52 to rim 12. This is made possible by the full line contact between rim 12 and edges 32 throughout the lengths of the latter and a similar, full-length line contact between edges 34 and the bottoms of cavities 46.

It can now be readily appreciated that all of the advantageous features of my said Patent No. 2,614,602 have been retained in the present invention and that, by virtue of the many improvements provided in the present invention, the scope of the field to which this disclosure relates, has been appreciably extended. Therefore, it is desired to be limited only by the spirit of this invention as defined by the scope of the appended claims.

Having thus described the invention what is claimed as new and desired to be secured by Letters Patent is:

1. In combination, a wheel having a continuous rim provided with an outer, circular face, an inner face and a pair of opposed, annular edges; a continuous, resilient tire circumscribing the rim, said tire being provided with a pair of opposed, annular sides and having an inner circular surface spanning the distance between said edges in relatively tight engagement with said outer face of the rim, there being a plurality of circumferentially-spaced pairs of opposed cavities in the tire at the zones of juncture between said sides and said inner surface of the tire, said cavities facing outwardly in opposite directions and facing said rim, said inner surface of the tire being provided with a groove bridging the distance between each pair of cavities respectively and facing the rim; a clip within each cavity respectively and engaging said outer face of the rim, each clip having a hook looped over the corresponding edge of the rim in engagement therewith and engaging said inner face of the rim; and take-up means in each groove respectively and interconnecting proximal clips for clamping the latter against said faces and said edges of the rim and for clamping the tire between the clips.

2. The invention as set forth in claim 1 wherein each take-up means comprises a bolt and a nut, the bolts engaging said outer face of the rim adjacent said edges of the rim, the clips having openings receiving the bolts.

3. The invention as set forth in claim 1 wherein each clip fills its cavity and wherein the clips and the cavities are each provided with a pair of opposed ends, the ends of the clips engaging the ends of the cavities for holding the tire against circumferential slippage relative to the rim.

4. The invention as set forth in claim 1 wherein each clip comprises an elongated segment of a circle, presenting a concave and a convex edge concentric with the wheel, the entire concave edge of each clip engaging said outer face of the rim.

5. The invention as set forth in claim 4 wherein each clip fills its cavity and wherein the clips and the cavities are each provided with a pair of opposed ends, the ends of the clips engaging the ends of the cavities for holding the tire against circumferential slippage relative to the rim.

6. The invention as set forth in claim 5 wherein each take-up means comprises a bolt and a nut, the bolts engaging said outer face of the rim adjacent said edges of the rim, the clips having openings receiving the bolts.

References Cited in the file of this patent
UNITED STATES PATENTS

| 1,122,875 | Doty | Dec. 29, 1914 |
| 1,203,458 | Barnes | Oct. 31, 1916 |
| 2,614,602 | Stewart | Oct. 21, 1952 |